United States Patent [19]

Schilling

[11] Patent Number: 5,067,442
[45] Date of Patent: Nov. 26, 1991

[54] FORAGE FEEDING DEVICE

[76] Inventor: Harold D. Schilling, R.R. 1, Box 198, Colesburg, Iowa 52035

[21] Appl. No.: 327,100

[22] Filed: Mar. 22, 1989

[51] Int. Cl.⁵ .................................................. A01K 1/10
[52] U.S. Cl. .......................................... 119/60; 49/149
[58] Field of Search ................. 119/58, 59, 60, 20, 119/82, 155; 384/19; 49/149, 366; 296/6, 7, 11, 151; 248/100

[56] References Cited

U.S. PATENT DOCUMENTS

| | | | |
|---|---|---|---|
| 479,680 | 7/1892 | Thompson | 119/60 X |
| 1,542,164 | 6/1925 | Nelson | 248/100 X |
| 2,325,896 | 8/1943 | Waller | 384/19 |
| 2,491,577 | 12/1949 | Olinger | 119/60 X |
| 2,729,196 | 1/1956 | Breitenbach | 119/20 |
| 3,336,908 | 8/1967 | Swanson | 119/60 |
| 3,834,353 | 9/1974 | Groezinger | 119/60 |
| 3,881,449 | 5/1975 | Burrack et al. | 119/60 |
| 3,906,902 | 9/1975 | Rose | 119/60 |
| 3,913,529 | 10/1975 | Leigh, Jr. | 119/60 |
| 4,002,147 | 1/1977 | Feterl | 119/60 |
| 4,009,687 | 3/1977 | Korthals | 119/60 X |
| 4,020,794 | 5/1977 | Nethery | 119/58 |
| 4,162,097 | 7/1979 | Scribner | 296/151 X |
| 4,193,378 | 3/1980 | Harden | 119/60 |
| 4,630,570 | 12/1986 | Wilson et al. | 119/20 |
| 4,722,302 | 2/1988 | Gee, Jr. | 119/60 |

FOREIGN PATENT DOCUMENTS 8003691  1/1982  Netherlands ........................... 119/58

Primary Examiner—Robert P. Swiatek
Assistant Examiner—Todd E. Manahan

[57] ABSTRACT

A collapsible forage feeding is provided with opposing C-shaped frames supported on wheels. The frames have front and rear members which are slidably received within guide tracks such that the frames can be rolled towards one another by the animals as feed is consumed and thereby provide access to additional feed. The wheels are rotatably mounted to the frames so that the device can be moved longitudinally or so that the frames can be moved laterally with respect to one another.

21 Claims, 5 Drawing Sheets

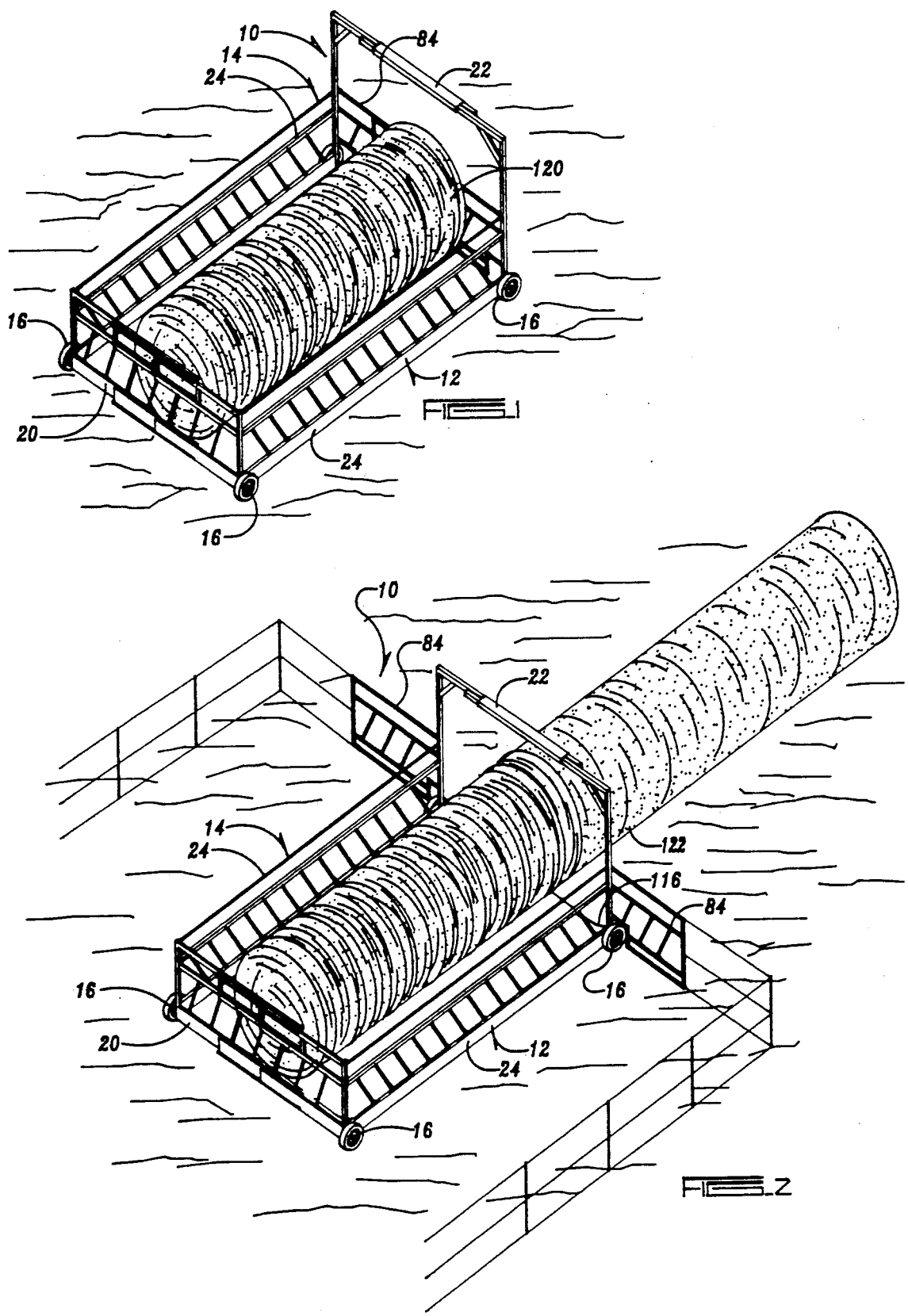

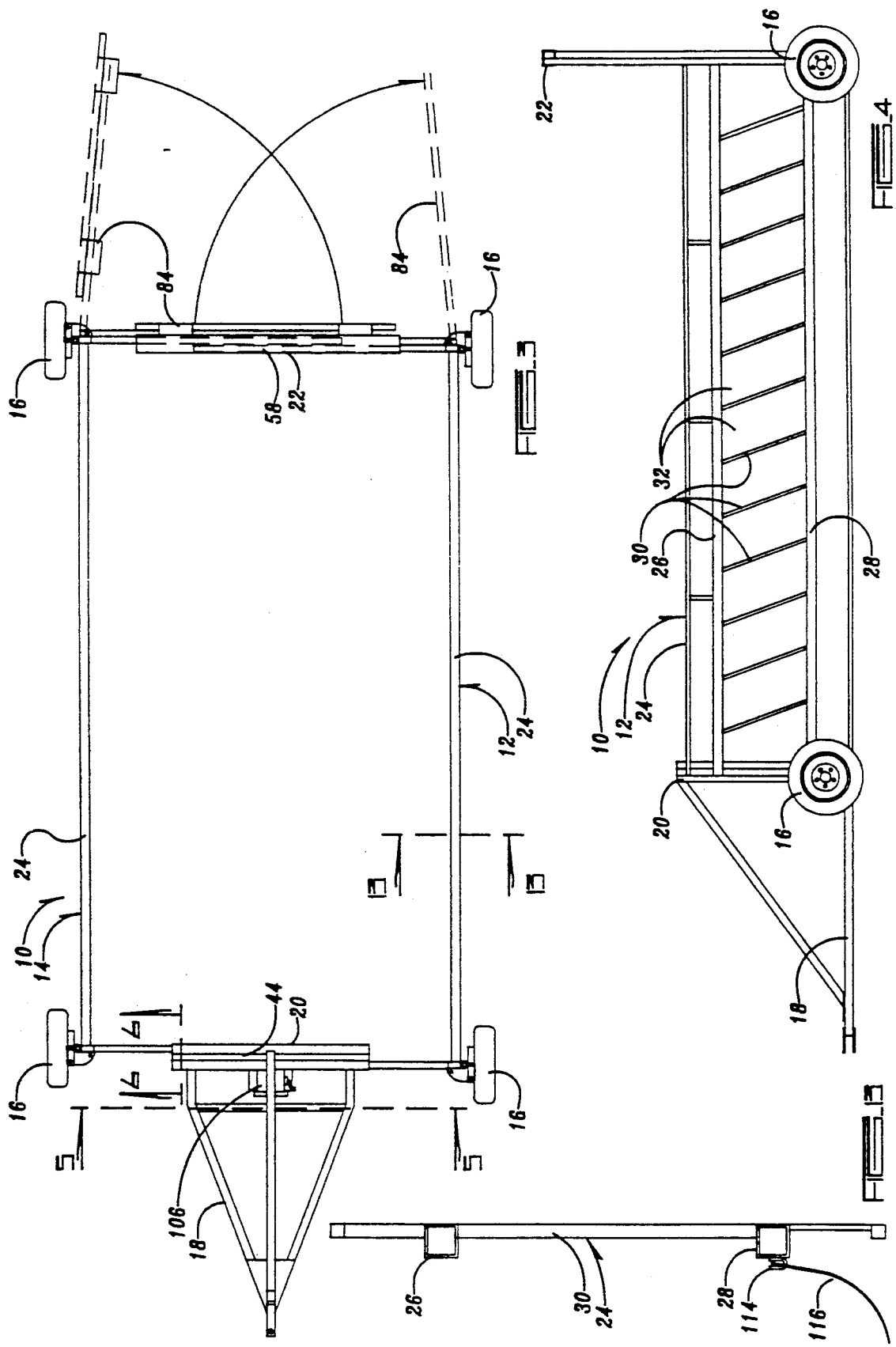

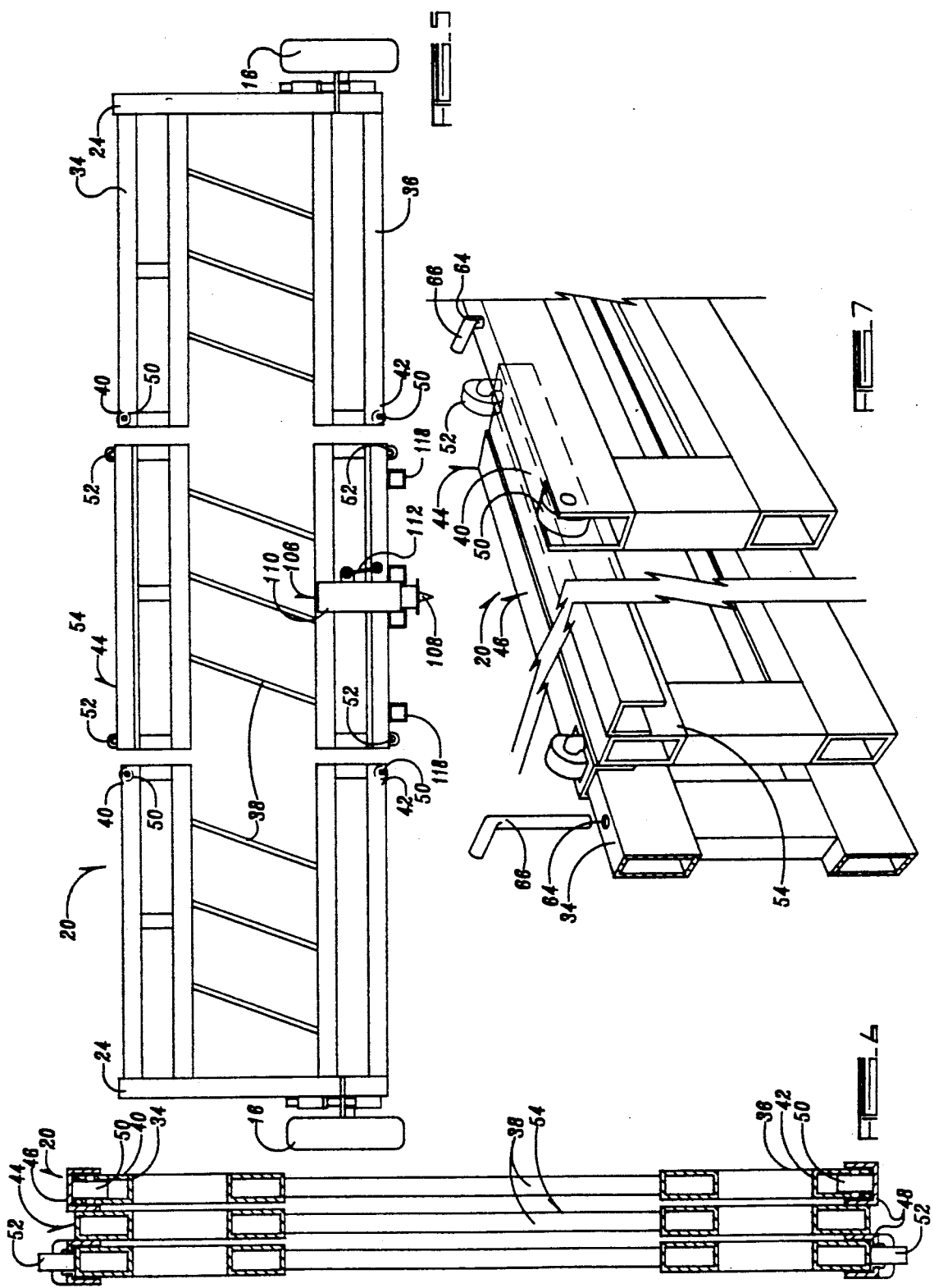

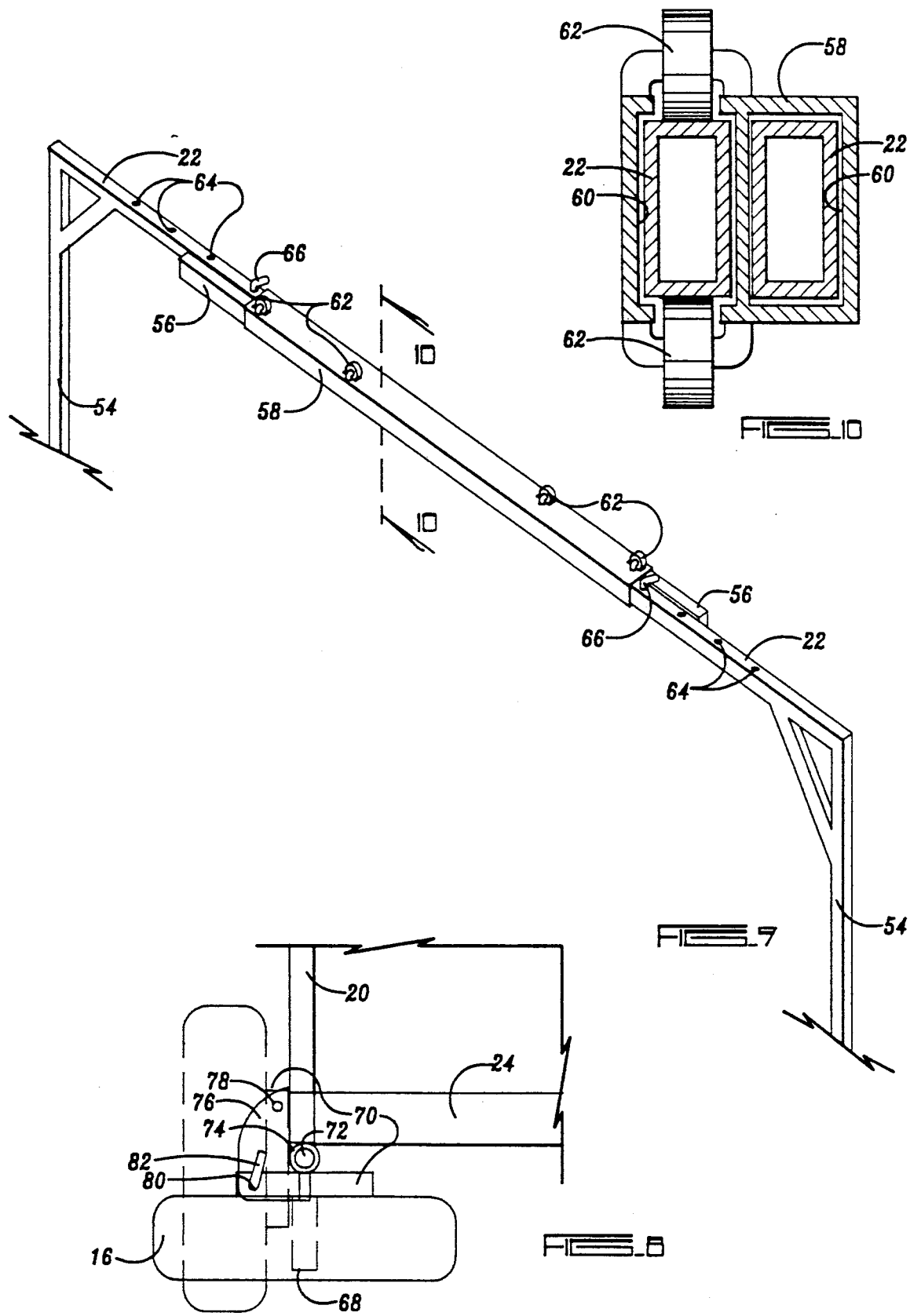

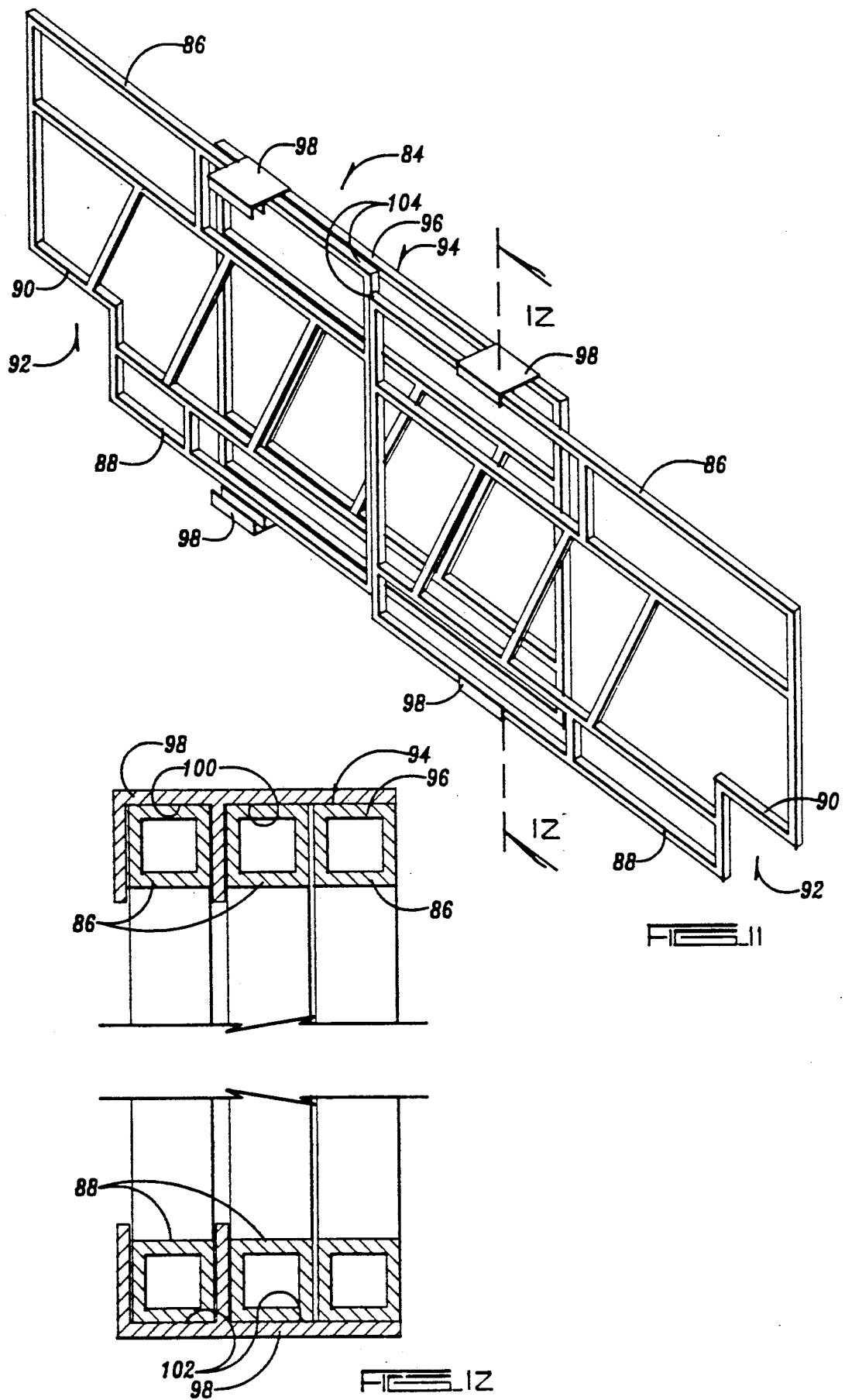

FORAGE FEEDING DEVICE

BACKGROUND OF THE INVENTION

Forage feeding devices for livestock have been well known and take many forms. Generally, the devices include a multi-sided frame which forms an enclosure around the feed, with openings in the frame through which the livestock can extend their heads for eating. However, as the feed is consumed, the remaining feed soon becomes beyond the reach of the animal.

To overcome this problem, collapsible feed frames have been designed which have sides which are movable toward the center of the enclosure as the feed is consumed. For example, U.S. Pat. No. 3,336,908 shows a device with end frame members and opposite side members which are slidably mounted on the end members, such that the side members can be moved towards one another by the animal to provide access to all the feed within the enclosed frame. However, the front and rear frame members of such a device have a fixed width which limits transportation of the device. Also, moving such a device into position around the feed is difficult since the back end thereof must be opened, which reduces stability of the overall device.

A primary objective of the present invention is the provision of an improved forage feed device.

Another objective of the present invention is the provision of an animal feed device which is collapsible.

A further objective of the present invention is the provision of a forage feed device having opposing frames which can be rolled towards one another by the animals as feed within the device is consumed so as to provide access to additional feed.

A further objective of the present invention is the provision of a forage feed device which is easily transported and positioned in a desired location.

Yet another objective of the present invention is the provision of an animal feed device with support wheels mounted on axles which can be rotated 90° such that the device can be moved longitudinally or such that the opposing frame members can be moved towards and away from one another.

Still another objective of the present invention is the provision of a forage feed device having guide tracks for guiding the movement of opposing frames toward and away from one another.

Another objective of the present invention is the provision of a forage feed device having a rearward end with a substantial clearance above the ground so that the device can be easily backed into position around bag silage, hay bales, or the like.

Still a further objective of the present invention is the provision of an animal feed device having gates at one end which can be opened and closed.

Another objective of the present invention is the provision of an animal feed device which forms a feed trough with the opened bag containing the feed.

A further objective of the present invention is the provision of a collapsible animal feed device which is economical to manufacture, and durable and safe in use.

These and other objectives will become apparent from the following description of the present invention.

SUMMARY OF THE INVENTION

The forage feed device of the present invention generally comprises first and second C-shaped frames which oppose one another. The frames each have front and rear frame members interconnected by a side frame member. The ends of the front frame members and rear frame members are slidably received within front and rear guide tracks, respectively. At least one roller is provided on the front and rear frame members to minimize friction with the guide tracks.

Each frame has a pair of support wheels which are pivotally connected to the frames so that the wheel axles are rotatable 90°. When, the axles are positioned perpendicular to the side frame members, the device can be pulled or pushed by a tractor or the like for transportation and for positioning around the feed. When the wheel axles are parallel to the side frame members, the frames can be collapsed and expanded with respect to one another, as guided by the guide tracks.

Rear gates are pivotally mounted to each frame for movement between an opened and closed positions. When in the closed position, a gate guide frame guides the movement of the gates as the frames are collapsed or expanded with respect to one another.

The rear frame members are raised for substantial clearance above the ground such that the device can be backed into position around bag silage, hay bales or other feed material. Upon opening a bag of silage, the bag can be secured to hooks on the side frame members so as to form a trough to minimize waste of the feed.

In use, animals extend their heads through openings in the side frame members. As the animals consume the feed, they push on the side frame members so as to roll the frames towards one another to provide easy access to the remaining feed.

BRIEF DESCRIPTION OF THE DRAWINGS

FIG. 1 is a perspective view of the forage feeding device of the present invention positioned around bales of hay, wherein the back gates are closed.

FIG. 2 is a perspective view of the device of the present invention positioned around an elongated bag of silage, wherein the back gates are opened.

FIG. 3 is a plan view of the device of the present invention.

FIG. 4 is a side elevational view of the device of the present invention.

FIG. 5 is a front elevational view taken along lines 5—5 of FIG. 3.

FIG. 6 is a sectional view taken along lines 6—6 of FIG. 3.

FIG. 7 is a partial perspective view showing the upper portion of the front frame members and front guide track of the feed device.

FIG. 8 is an enlarged top plan view showing the pivotal connection of the support wheels to the frame.

FIG. 9 is a partial perspective view showing the rear frame members and the rear guide track of the feed device of the present invention.

FIG. 10 is a sectional view taken along lines 10—10 of FIG. 9.

FIG. 11 is a perspective view showing the rear gates and gate guide track of the feed device.

FIG. 12 is a sectional view taken along lines 12—12 of FIG. 11.

FIG. 13 is a sectional view taken along lines 13—13 of FIG. 3 and showing the trough-forming hooks on the side frame members.

DETAILED DESCRIPTION OF THE INVENTION

The forage feed device of the present invention is generally designated by the reference numeral 10 in the drawings. The device includes a pair of C-shaped frames 12, 14 each of which are mounted upon support wheels 16. Device 10 includes a removable tongue 18 for attachment to the hitch of a prime mover, such as a tractor.

Frames 12, 14 oppose one another and are substantially mirror images of one another. Each frame 12, 14 includes a front frame member 20, a rear frame member 22, and a side frame member 24 which interconnects the front and rear frame members.

The side frame member 24 of each frame 12, 14 includes an upper rail 26 and a lower rail 28. A plurality of angularly disposed bars 30 extend between the upper and lower rails so as to define a plurality of openings 32 along the side frame member through which an animal's head may extend for eating the feed contained within device 10. The inclination of bars 30 require the animal to turn its head slightly when withdrawing its head from the opening 32. Such turning of the head naturally causes the animal to drop any feed remaining in its mouth, thereby minimizing or eliminating the spread of feed outside device 10.

The front frame members 20 are shown to have similar construction to the side frame members 24, including an upper rail 34 and a lower rail 36, with a plurality of angularly disposed bars 38. The front frame members have distal ends 40, 42 on the upper and lower rails 34, 36 respectively, opposite the connection with the side frame member 24.

The distal ends 40, 42 of the front frame members 20 are slidably received within a front guide track 44. More particularly, the front guide track 44 has a parallel pair of downwardly facing upper channels 46 and a parallel pair of upwardly facing lower channels 48 for receiving the upper distal ends 40 and the lower distal ends 42, respectively, of each front frame member 20. The front frame members 20 of each frame 12, 14 are offset with respect to one another for receipt in the channels, as best seen in 6.

As best seen in FIGS. 5 and 7, the distal ends 40, 42 of the front frame members have a notched-out portion for receiving a roller 50. Also, one end of each upper channel 46 has a roller 52 mounted thereon, as best seen in FIG. 7. Similarly, one end of each lower channel 48 has a roller, also designated by reference number 52, at one end thereof. The rollers 50, 52 minimize friction between the front frame members 20 and the front guide track channels 46, 48 as the frames 12, 14 move toward and away from one another, as subsequently described.

As best seen in FIGS. 4 and 9, the rearward end of each side frame member 24 has an extension member 54 extending upwardly therefrom. The rear frame members 22 are rigidly connected to the extension members 54 and have a free distal end 56. Thus, the rear frame members 22 are spaced substantially above the ground or support surface so as to pass over hay bales, bag silage, or other feed as device 10 is backed into position to enclose the feed.

A rear guide track 58 has a parallel pair of enclosed channels 60 into which distal ends 56 of rear frame members 22 slidably extend, as best seen in FIG. 10. Rear frame members 22 are offset with respect to one another for receipt in the channels, as best seen in FIG. 10. At least one roller 62 is mounted adjacent the top and bottom of each channel 60 so as to minimize friction with the rear frame member 22 as the members move within the channels, as described below.

Stop means may be provided to limit the movement of front frame members 20 and rear frame members 22 within front guide track 44 and rear guide track 58, respectively. An example of such a stop means is shown in FIGS. 7 and 9, where the front and rear frame members have a plurality of apertures 64 for receiving a pin 66. Pin 66 can be selectively placed in any of the apertures 64, and is adapted to engage the ends of the respective guide track 44, 58 so as to prevent further movement of the front and rear frame members into the associated guide track.

Wheels 16 are pivotally connected to frames 12, 14 adjacent the corners thereof, as best seen in FIG. 8. More particularly, each wheel is mounted on an axle 68, which in turn is fastened to an element 70. Element 70 is secured by welding or the like to a vertically disposed shaft 72 which is journaled within bearings 74. A plate 76 is mounted on the frames 12, 14 adjacent the shaft 72, and has a pair of holes 78, 80 therein. Element 70 also has a hole therein which is alignable with either hole 78 or hole 80 in plate 76. A pin 82 is adapted to extend through the hole in element 70 and into hole 78 or hole 80 in plate 76. Thus, wheel axle 68 is pivotal on shaft 72 between a first position wherein the axle is perpendicular to the side frame members 24 and a second position, wherein the axle is parallel to the side frame members 24. Pin 82 locks the wheel axle in the selected position.

When the wheel is in the first position, device 10 can be easily transported or moved longitudinally for positioning around the feed. When the wheels are in the second position, the frames 12, 14 can be rolled towards and away from one another, as guided by the guide tracks 44, 58.

Device 10 also includes a pair of rear gates 84 pivotally connected to the side frame members 24 adjacent the rear end of the frames 12, 14. Gates 84 can be moved between a closed position, as shown in FIG. 1, and an opened position, as shown in FIG. 2.

As best seen in FIG. 11, each gate 84 has an upper rail 86 and a lower rail 88. The lower rail 88 has a raised portion 90 so as to define a recess 92 adjacent the side frame member 24. Recess 92 provides clearance above wheels 16 when the gates are in the open position, as seen in FIG. 2.

When gates 84 are in the closed position, a gate guide track 94 is provided to guide the movement of the gates towards and away from one another in conjunction with the lateral movement of the frames 12, 14. Gate guide track 94 includes a rectangular frame 96 with upper and lower F-shaped elements secured thereto by welding or the like. Elements 98 define a parallel pair of upper channels 100 and a pair of lower channels 102 for receiving the distal ends 104 of gates 84. Gates 84 are offset with respect to one another for receipt in the channels, as best seen in FIG. 12. Gates 84 are slidable within channels 100, 102 as the frames 12, 14 move within guide tracks 44, 58.

In moving gates 84 form the closed position to the open position, guide track 94 must be slid to one side or the other, such that the opposite gate is not retained within channels 100, 102. The gates can then be swung open, and guide track 94 removed if desired. The procedure is reversed for moving the gates from the open position to the closed position.

In use, wheels 16 can be moved to the second position and frames 12, 14 collapsed towards one another so as to minimize the width of device 10. The wheels can then be moved to the first position such that the device can be moved by a prime mover (not shown) along a road or through openings, such as fence gates and barn doors. Also, with the wheels in the first position, the device can be backed into position, with gates 84 open, around hay bales 120 or bag silage 122.

Once device 10 is in position substantially enclosing the feed, rear gates 84 can be closed, if necessary. Wheels 16 are then pivoted to the second position so that frames 12, 14 are free to roll towards one another. The animals extend their heads through the openings 32 inside frame members 24 for access to the feed. As the feed is consumed, the animals push on the side frame members 24 and thereby roll the frames 12, 14 towards one another, as guided by guide tracks 44, 58, so as to have access to additional feed. The collapsing movement of the frames 12, 14 can be selectively limited by pins 66.

Side frame members 24 can be moved independently of one another. To prevent the entire device 10 from moving in one direction, for example when more animals are feeding on one side than the other, an anchor means 106 is provided on front guide track 44 as best seen in FIG. 5. Anchor means 106 includes a stake 108 telescopingly mounted within a housing 110 connected to front guide track 44. Stake 108 can be raised and lowered by crank 112. Thus, stake 108 can be forced into the ground to hold front guide track 44 against movement, and thereby prevent lateral movement of the entire device 10 in only one direction.

A plurality of hooks 114 are provided on the inner face of side frame members 24, as best seen in FIG. 13. Particularly when bag silage is used as the feed material, the bag 116 can be opened and the edges thereof forced over the hooks so as to define a trough between the opposite side frame members 24. The trough prevents feed from being scattered on the ground, and there minimizes feed waste.

For convenience, tongue 18 is removably mounted on device 10. More particularly, tongue 18 has a tubular construction and is mounted onto front guide track 44 by means of tongue receiving elements 118, as best seen in FIG. 5. Tongue 18 is secured within receiving elements 118 in any convenient manner, such as pins (not shown) or the like.

From the foregoing, it can be seen that the present invention accomplishes at least all of the stated objectives. It is also understood that the construction of the various components of device 10, including the frame members 20, 22, 24, the guide tracks 44, 58, the gates 84, and the gate guide track 94, can be modified from that shown in the drawings and described above without departing from the scope of the present invention.

What is claimed is:

1. A forage feed device, comprising:
   first and second frames, each frame including a side frame member with forward and rearward ends, a front frame member having one end connected to the forward end of the side frame member and a distal opposite end, and a rear frame member having one end connected to the rearward end of the side frame member and a distal opposite end, the side frame members having openings therein through which an animal's head is extended for eating feed;
   a pair of spaced apart support wheels secured to each frame for rollably supporting the respective frame on a support surface;
   a front guide track having opposite sides and having a pair of channels extending toward one another from the opposite sides, said channels having longitudinal axes residing in parallel planes, and said channels slidably receiving the respective distal ends of the front frame members so that the distal ends may slide past one another in the respective channel;
   a rear guide track having opposite sides and having a pair of channels extending toward one another from the opposite sides, said channels having longitudinal axes residing in parallel planes, and said channels slidably receiving the respective distal ends of the rear frame members so that the distal ends may slide past one another in the respective channel; and
   the first and second frames and the front and rear guide tracks defining an enclosure for containing animal feed, whereby, as the feed is consumed, the animals push against the side frame members so as to roll the first and second frames upon the support wheels towards one another, as guided by the front and rear guide tracks, so as to provide access to additional feed.

2. The device of claim 1 wherein the rear end of each side frame member has an upright extension member with an upper end spaced substantially above the support surface, the rear frame member of each frame being connected to the upper end of the extension member whereby the device can be backed into position with the rear frame members passing over the feed and the side frame members positioned on opposite sides of the feed.

3. The device of claim 1 wherein the support wheels are non-castering and each wheel has an axle pivotally secured to the frames for movement between a first position with the axle being substantially perpendicular to the side frame members so that the device can be moved longitudinally, and a second position with the axle being substantially parallel to the side frame members so that the frames can roll laterally toward and away from one another.

4. The device of claim 3 further comprising locking means for selectively maintaining the wheels in the first or second position.

5. The device of claim 1 further comprising stop means for limiting the sliding movement of the front and rear frame members within the front and rear guide tracks, respectively.

6. The device of claim 5 wherein the stop means includes a plurality of holes in each front and rear frame member and a pin selectively positioned in one of the holes in each front and rear frame member, the pin being adapted to engage the respective front or rear guide track to prevent further movement of the respective front and rear frame member into the respective channel of the guide tracks.

7. The device of claim 1 further comprising at least one roller mounted on each guide track and extending partially into the channel thereof so as to reduce friction with the respective front and rear frame member.

8. The device of claim 1 further comprising at least one roller mounted on each front frame member for rolling within the respective channel of the front guide track so as to reduce friction therebetween.

9. The device of claim 1 further comprising anchor means for securing the front guide track to the support surface to prevent lateral movement thereof.

10. The device of claim 1 further comprising first and second gates having one end pivotally secured to the rearward end of the side frame members of the first and second frames, respectively, and a distal opposite end, and being pivotal between a closed position and an open position.

11. The device of claim 10 further comprising a gate guide track having opposite sides and having a pair of channels extending toward one another from the opposite sides for receiving the respective distal ends of the first and second gates.

12. The device of claim 10 wherein the first and second gates each have a recessed portion for extending around the wheels when the gates are in the open position.

13. The device of claim 1 wherein the front and rear guide tracks are supported by the front and rear frame members, respectively, of the first and second frames.

14. The device of claim 1 further comprising hook means on the side frame members, whereby upon the use of a feed-containing bag, the bag can be opened and fastened to the hook means so as to form a trough for preventing the feed from falling on the support surface and being wasted.

15. A collapsible animal feed device, comprising:
first and second C-shaped frames each having opposite front and rear members and an interconnecting side member with forward and rearward ends, the first and second frames opposing one another, the side members having openings therein through which an animals' heads extend for eating feed;
support wheels secured to each frame for rollably supporting the respective frame on a support surface;
a front guide track slidably receiving the front members of the first and second frames in different planes such that the front members may overlap one another;
a rear guide track slidably receiving the rear members of the first and second frames in different planes such that the rear members may overlap one another; and
the first and second frames and the front and rear guide tracks defining an enclosure for containing animal feed, whereby as the feed is consumed, the animals push on the side members so as to roll the first and second frames towards one another, as guided by the guide tracks, so as to provide access to additional feed.

16. The device of claim 15 wherein the support wheels each have an axle pivotally secured to the frames for pivotal movement between a first position with the axle being substantially perpendicular to the side members so that the device can be moved longitudinally, and a second position with the axle being substantially parallel to the side members so that the frames can roll laterally toward and away from one another.

17. The device of claim 15 further comprising stop means for limiting the sliding movement of the front and rear members within the front and rear guide tracks, respectively.

18. The device of claim 15 further comprising first and second gates secured to the rearward ends of the side members of the first and second frames, respectively, and being pivotal between open and closed positions.

19. The device of claim 18 further comprising a gate guide track slidably receiving the first and second gates.

20. The device of claim 15 wherein the front and rear guide tracks are supported by the front and rear members, respectively, of the first and second frames.

21. The device of claim 15 further comprising roller means mounted on the front guide track or on the front members of the frames so as to minimize friction therebetween.

* * * * *